(No Model.)
W. M. VISER.
HEDGE.
No. 344,885. Patented July 6, 1886.
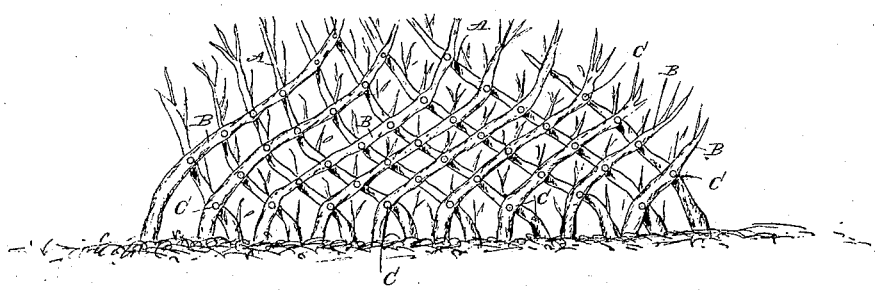
WITNESSES
Howard J. Schneider
Alfred I. Gage
INVENTOR
William M. Viser
by Franklin H. Hough
Attorney

UNITED STATES PATENT OFFICE.

WILLIAM M. VISER, OF PADUCAH, KENTUCKY.

HEDGE.

SPECIFICATION forming part of Letters Patent No. 344,885, dated July 6, 1886.

Application filed April 6, 1886. Serial No. 198,030. (No model.)

*To all whom it may concern:*

Be it known that I, WILLIAM M. VISER, a citizen of the United States, residing at Paducah, in the county of McCracken and State of Kentucky, have invented certain new and useful Improvements in Hedges; and I do hereby declare the following to be a full, clear, and exact description of the invention, such as will enable others skilled in the art to which it appertains to make and use the same, reference being had to the accompanying drawing and letters of reference marked thereon, which form a part of this specification.

The invention relates to the art of training hedge fences, and has for its object to provide a hedge fence which will present a strong and impassable barrier to stock of any kind, and will at the same time form a complete and perfect wind-break.

Referring to the drawing, the figure is a front view of a section of hedge constructed in accordance with my invention.

In the formation of the hedge fence the sprouts or plants are set in a continuous row along the line of the proposed fence, and preferably about four inches apart. They are allowed to grow in an upright or vertical position until they attain a sufficient size to be used in the construction of the fence. The plants are then divested of all their branches, in accordance with the present custom in the construction of hedge fences. Each alternate plant A A is then bent down or inclined in one direction, in the plane of the fence, the angle of inclination being preferably about forty-five degrees. The remaining alternate plants, B B, are bent down in the plane of the fence in a direction opposite to that in which the plants A are inclined, and at each point of contact between the oppositely-inclined plants the plants are permanently secured together by means of a pin or rivet, C, passed through the stems of the plants, as shown. It is at once evident that a hedge constructed in the manner described will be composed of a series of meshes formed by the living plants. The sprouts growing upon the upper surface of each of the inclined plants, upon either side of the meshes, will completely cover the openings and form a perfectly tight fence or wall, which will serve to effectually turn stock, and will also serve as a complete and perfect protection from the wind.

In the plashing of hedge fences it has heretofore been customary to remove a portion of the earth from the roots, and after bending the plants to secure the same in place, either by a continuous wire extended along the line of the fence, and loops I around each of the plants, or securing the wire to the plants by means of staples, or by securing the same to stakes or posts. Each of these methods is open to serious objections, as I have found from experience that, aside from the extra cost of the wire, a serious objection to its use in a hedge fence exists in the fact that a far greater injury is done to the plants by surrounding the same with a wire loop or staple than by my process of passing a pin directly through the stem. Where stakes or posts are used, the fence is continually becoming weakened by displacement and decay of the supports.

As my fence is composed entirely of living plants, no artificial support is required, and the strength and durability of the fence increase with the age of the plants.

I am aware that it has been proposed to construct hedge fences of living plants bent down in the plane of the fence, each alternate plant being inclined in opposite directions, and scraping off the bark at the points of intersection, and then binding the plants together at such points of intersection with some fragile material—such as straw—depending not upon the binding material to permanently hold the plants together, but upon the uniting of the fibers of the two intersecting plants in the further growth of the same; but, as far as I am aware, it has never before been proposed to permanently unite the intersecting plants at the time they are bent by means of a pin passed through the plants at their points of intersection.

Having thus described my invention and set forth its merits, what I claim to be new, and desire to secure by Letters Patent, is—

A hedge fence composed of living plants bent down in the plane of the hedge, each alternate plant being inversely inclined, combined with retaining-pins passed through said plants at their points of intersection, in contradistinction to a wire or other substance passing around the same, substantially as described.

In testimony whereof I affix my signature in presence of two witnesses.

WILLIAM M. VISER.

Witnesses:
WM. G. HENDERSON,
FRANKLIN H. HOUGH.